United States Patent
Oshima et al.

(10) Patent No.: US 11,152,821 B2
(45) Date of Patent: Oct. 19, 2021

(54) METALLIC FOREIGN OBJECT DETECTOR, WIRELESS POWER TRANSMITTING DEVICE, WIRELESS POWER RECEIVING DEVICE, AND WIRELESS POWER TRANSMISSION SYSTEM

(71) Applicant: TDK Corporation, Tokyo (JP)

(72) Inventors: Kazunori Oshima, Tokyo (JP); Akira Gotani, Tokyo (JP); Kazuki Kondo, Tokyo (JP); Narutoshi Fukuzawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 55 days.

(21) Appl. No.: 16/469,498

(22) PCT Filed: Dec. 20, 2017

(86) PCT No.: PCT/JP2017/045742
§ 371 (c)(1),
(2) Date: Jun. 13, 2019

(87) PCT Pub. No.: WO2018/123766
PCT Pub. Date: Jul. 5, 2018

(65) Prior Publication Data
US 2019/0393732 A1    Dec. 26, 2019

(30) Foreign Application Priority Data
Dec. 27, 2016  (JP) .............................. JP2016-253816

(51) Int. Cl.
*H02J 50/60*   (2016.01)
*H02J 50/12*   (2016.01)
(Continued)

(52) U.S. Cl.
CPC ................ *H02J 50/60* (2016.02); *G01V 3/10* (2013.01); *H02J 50/12* (2016.02); *H02J 7/025* (2013.01); *H02M 7/06* (2013.01); *H02M 7/5387* (2013.01)

(58) Field of Classification Search
None
See application file for complete search history.

(56) References Cited

U.S. PATENT DOCUMENTS

2013/0162054 A1   6/2013  Komiyama
2014/0084857 A1   3/2014  Liu et al.
(Continued)

FOREIGN PATENT DOCUMENTS

JP    2013-132133 A    7/2013
JP    2015-204707 A    11/2015

OTHER PUBLICATIONS

International Search Report issued in corresponding International Patent Application No. PCT/JP2017/045742, dated Mar. 27, 2018, with English Translation.

*Primary Examiner* — Lincoln D Donovan
*Assistant Examiner* — Khareem E Almo
(74) *Attorney, Agent, or Firm* — McDermott Will & Emery LLP

(57) ABSTRACT

An object of the present invention is to suppress deterioration in detection accuracy during power feeding in the detection of the metallic foreign object using the antenna coil. A metallic foreign object detector includes: an antenna coil; a capacitor that constitutes a resonance circuit RC together with the antenna coil; a power supply that applies voltage to the resonance circuit to generate a vibration signal in the resonance circuit; a determination circuit that determines the presence/absence of a metallic foreign object based on the waveform of the vibration signal; a resonance capacitor switch inserted into the resonance circuit; and a (Continued)

control circuit that controls the open/close state of the resonance capacitor switch. The control circuit brings the resonance capacitor switch into a closed state responding to the power supply starting application of voltage to the resonance circuit.

10 Claims, 14 Drawing Sheets

(51) Int. Cl.
*G01V 3/10* (2006.01)
*H02J 7/02* (2016.01)
*H02M 7/06* (2006.01)
*H02M 7/5387* (2007.01)

(56) References Cited

U.S. PATENT DOCUMENTS

| | | | |
|---|---|---|---|
| 2014/0239735 A1* | 8/2014 | Abe | B60L 53/124 |
| | | | 307/104 |
| 2015/0091387 A1* | 4/2015 | Okazaki | H02J 50/60 |
| | | | 307/104 |
| 2019/0109498 A1* | 4/2019 | Stingu | H03F 3/2176 |
| 2019/0326787 A1* | 10/2019 | Kondo | G01V 3/10 |
| 2019/0386492 A1* | 12/2019 | Fukuzawa | H02J 7/025 |
| 2019/0393732 A1* | 12/2019 | Oshima | H02J 50/12 |
| 2020/0012007 A1* | 1/2020 | Oshima | H02J 50/60 |
| 2020/0076246 A1* | 3/2020 | Fukuzawa | H02J 50/60 |
| 2020/0091776 A1* | 3/2020 | Kondo | H02J 50/60 |
| 2020/0161906 A1* | 5/2020 | Choi | H02J 7/00036 |

* cited by examiner

METALLIC FOREIGN OBJECT DETECTOR, WIRELESS POWER TRANSMITTING DEVICE, WIRELESS POWER RECEIVING DEVICE, AND WIRELESS POWER TRANSMISSION SYSTEM

CROSS REFERENCE

This application is the U.S. National Phase under 35 U.S.C. § 371 of International Application No. PCT/JP2017/045742, filed on Dec. 20, 2017, which claims the benefit of Japanese Application No. 2016-253816, filed on Dec. 27, 2016, the entire contents of each are hereby incorporated by reference.

TECHNICAL FIELD

The present invention relates to a metallic foreign object detector, a wireless power transmitting device, a wireless power receiving device, and a wireless power transmission system.

BACKGROUND ART

In recent years, wireless power feeding adapted to feed power by wireless has been eagerly studied. There are various systems for realizing the wireless power feeding, and a system using a magnetic field is known as one of them. The system using a magnetic field includes an electromagnetic induction system and a magnetic field resonance system.

The electromagnetic induction system, which is already widely known, can perform power feeding with high efficiency due to a high coupling degree between a power transmitting device for feeding power and a power receiving device for receiving power, whereas power feeding cannot be achieved unless the power transmitting device and power receiving device are located close to each other. On the other hand, the magnetic field resonance system is a system that actively uses a resonance phenomenon, so that the coupling degree between the power transmitting device and the power receiving device may be low, and power feeding can be achieved even when the power transmitting device and the power receiving device are located away from each other to some extent.

The electromagnetic induction system and magnetic field resonance system both perform power feeding by using magnetism. Thus, in both the systems, the power transmitting device has a feeding coil for feeding power by using magnetism, and the power receiving device has a receiving coil for receiving power by using magnetism. The feeding coil and the receiving coil are magnetically coupled to each other, whereby power is fed from the power transmitting device to power receiving device.

When a metallic foreign object enters between the magnetically coupled feeding coil and receiving coil, an eddy current flows in the metallic foreign object by magnetic flux, resulting in heat generation in the metallic foreign object, which deteriorates power feeding efficiency. Thus, it is necessary to detect the metallic foreign object entering between the power transmitting device and the power receiving device.

As a method of detecting the metallic foreign object, there is known a detection coil system using an antenna coil for detection. For example, Patent Document 1 discloses a device that applies an impulse to an antenna coil to detect the metallic foreign object based on a change in a Q-value calculated from the amplitude value and time information of a response waveform (attenuation vibrating wave) to the applied impulse.

Further, Patent Document 2 discloses a non-contact power transmission device. The device executes metal detection using an antenna coil when no power is fed to a transmission coil. On the other hand, when power is fed to the transmission coil, the device suspends the metal detection using the antenna coil and performs detection of the foreign object by monitoring a temperature using a temperature sensor.

CITATION LIST

Patent Document

[Patent Document 1] JP 2013-132133 A
[Patent Document 2] JP 2015-204707 A

SUMMARY OF INVENTION

Technical Problem to be Solved by Invention

However, the technique disclosed in Patent Document 1 has a problem in that the detection accuracy of the metallic foreign object is deteriorated during power feeding. That is, while power feeding is being performed, resonance due to the energy of magnetic flux generated from the feeding coil or switching noise on the power feeding side may be generated in the antenna coil. If this resonance is being generated when the impulse for foreign object detection is applied to the antenna coil, the response waveform to the impulse is changed not only by the presence/absence of the metallic foreign object, but also by this resonance. This makes it difficult to accurately detect the metallic foreign object from a change in the response waveform.

In the technique disclosed in Patent Document 2, detection of foreign object during power feeding is performed by the temperature sensor, not by the antenna coil, so that the above problem does not occur essentially. However, the temperature sensor is required in the technique disclosed in Patent Document 2, so that an increase in the size of the device and cost may occur.

If power feeding is suspended when detection of the metallic foreign object is performed, the above problem can be solved in a fashion. However, in this case, power feeding needs to be periodically suspended, disadvantageously increasing charging time.

The present invention has been made in view of the above problem, and the object thereof is to suppress deterioration in detection accuracy during power feeding in the detection of the metallic foreign object using the antenna coil.

Means for Solving the Problem

A metallic foreign object detector according to the present invention includes: an antenna coil; a capacitor that constitutes a resonance circuit together with the antenna coil; a drive part that applies voltage to the resonance circuit to generate a vibration signal in the resonance circuit; a determination part that determines the presence/absence of a metallic foreign object based on the waveform of the vibration signal; a first switch inserted into the resonance circuit; and a control part that controls the open/close state of the first switch. The control part brings the first switch into a closed state responding to the drive part starting application of voltage to the resonance circuit.

According to the present invention, the resonance circuit is not constituted until the drive part starts the voltage application, thereby preventing occurrence of resonance due to the energy of magnetic flux generated from the feeding coil or switching noise on the power feeding side. Thus, in detection of a metallic foreign object using an antenna coil, deterioration in detection accuracy during power feeding can be suppressed. This eliminates the need to use the temperature sensor which is used in Patent Document 2, making it possible to avoid increase in device size and cost. Further, it is not necessary to periodically suspend power feeding, making it possible to avoid increase in charging time.

In the above metallic foreign object detector, the control part may bring the first switch into a closed state simultaneously with the end of the voltage application to the resonance circuit by the drive part. With this configuration, it is possible to prevent occurrence of resonance in the resonance circuit due to the energy of magnetic flux generated from the feeding coil or switching noise on the power feeding side even while voltage is applied to the resonance circuit by the drive part. Thus, it is possible to further suppress deterioration in detection accuracy during power feeding.

The above metallic foreign object detectors may further include a second switch inserted between the drive part and the resonance circuit. In this metallic foreign object detector, the control part may include a switch drive signal generation circuit that generates a switch drive signal for controlling the open/close state of the first switch and a pulse application signal generation circuit that generates a pulse application signal for controlling the open/close state of the second switch. The switch drive signal generation circuit may activate the switch drive signal and starts a timer when the pulse application signal has become inactivated and inactivate the switch drive signal when the timer value reaches a predetermined value. With this configuration, the control part can bring the first switch into a closed state (i.e., activation of the switch drive signal) simultaneously with the end (i.e., inactivation of the pulse application signal) of the voltage application to the resonance circuit by the drive part.

The above metallic foreign object detectors may further include a second switch inserted between the drive part and the resonance circuit. In this metallic foreign object detector, the control part may include a switch drive signal generation circuit that generates a switch drive signal for controlling the open/close state of the first switch, a pulse application signal generation circuit that generates a pulse application signal for controlling the open/close state of the second switch, and a delay circuit that receives the input of the pulse application signal. The delay circuit may activate an output signal therefrom and starts a timer when the pulse application signal is activated and inactivate the output signal when the timer value has reached a predetermined value. The switch drive signal generation circuit may activate the switch drive signal and starts a timer when the output signal has become inactivated and inactivate the switch drive signal when the timer value has reached a predetermined value. With this configuration, the control part can shift the inactivation time of the pulse application signal and the activation time of the switch drive signal from each other.

In the metallic foreign object detectors, the drive part may be used as a drive power supply for a circuit constituting a part of the control part. This achieves reduction in the number of components and cost.

The metallic foreign object detectors may further include a second switch inserted between the drive part and the resonance circuit. In this metallic foreign object detector, the control part may include a switch drive signal generation circuit that generates a switch drive signal for controlling the open/close state of the first switch and a pulse application signal generation circuit that generates a pulse application signal for controlling the open/close state of the second switch. The switch drive signal generation circuit and the pulse application signal generation circuit may have a common drive power supply. This also achieves reduction in the number of components and cost.

A wireless power transmitting device according to the present invention is a device that transmits power by wireless from a feeding coil to a receiving coil and includes the feeding coil and any one of the above metallic foreign object detectors. According to the present invention, it is possible to obtain a wireless power transmitting device having a metallic foreign object detector capable of suppressing deterioration in detection accuracy during power feeding in the detection of the metallic foreign object by using an antenna coil.

A wireless power receiving device according to the present invention is a device that transmits power by wireless from a feeding coil to a receiving coil and includes the receiving coil and any one of the above metallic foreign object detectors. According to the present invention, it is possible to obtain a wireless power receiving device having a metallic foreign object detector capable of suppressing deterioration in detection accuracy during power feeding in the detection of the metallic foreign object using an antenna coil.

A wireless power transmission system according to the present invention is a system that transmits power by wireless from a feeding coil to a receiving coil and includes a wireless power transmitting device having the feeding coil and a wireless power receiving device having the receiving coil. At least one of the wireless power transmitting device and wireless power receiving device has any one of the above metallic foreign object detectors. According to the present invention, it is possible to obtain a wireless power transmission system having, at least in one of the wireless power transmitting device and wireless power receiving device, a metallic foreign object detector capable of suppressing deterioration in detection accuracy during power feeding in the detection of the metallic foreign object using an antenna coil.

Advantageous Effects of the Invention

According to the present invention, it is possible to suppress deterioration in detection accuracy during power feeding in the detection of the metallic foreign object using the antenna coil.

MODE FOR CARRYING OUT THE INVENTION

Figure 1:
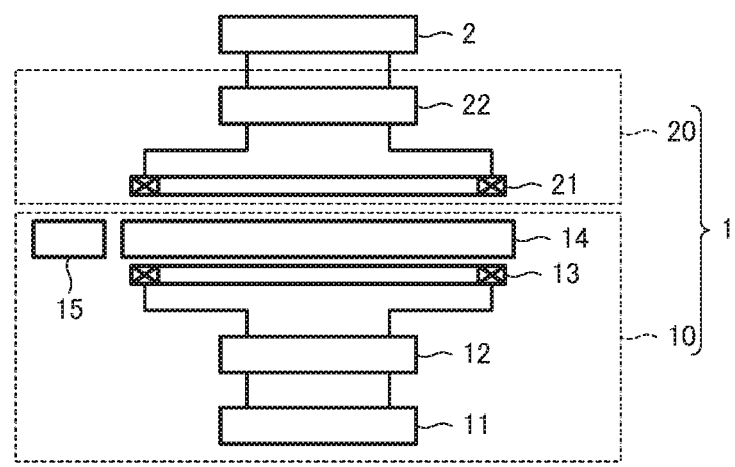
FIG. 1 is a view illustrating the schematic configuration of a wireless power transmission system 1 according to an embodiment of the present invention and a load 2 connected to the wireless power transmission system 1.

Hereinafter, embodiments of the present invention will be described in detail with reference to the accompanying drawings. The present invention is not limited by the content described below. Further, constituent elements of the following embodiments include those easily occur to those skilled in the art, and include those substantially identical or equivalent in the scope thereof. Furthermore, in the following description, the same reference numerals are given to the same elements or elements having the same function, and repeated description will be omitted.

FIG. 1 is a view illustrating the schematic configuration of a wireless power transmission system 1 according to an embodiment of the present invention and a load 2 connected to the wireless power transmission system 1. As illustrated, the wireless power transmission system 1 includes a wireless power transmitting device 10 and a wireless power receiving device 20. The load 2 is connected to the wireless power receiving device 20.

The wireless power transmission system 1 is a system used for power feeding to a moving body such as an electric vehicle (EV) or a hybrid vehicle (HV) that utilizes power from a secondary battery. In this case, the wireless power transmitting device 10 is mounted in power feeding facility installed on the ground, and the wireless power receiving device 20 is mounted on the vehicle. The following description will be given assuming that the wireless power transmission system 1 is a system for power feeding to the electric vehicle.

Figure 2:
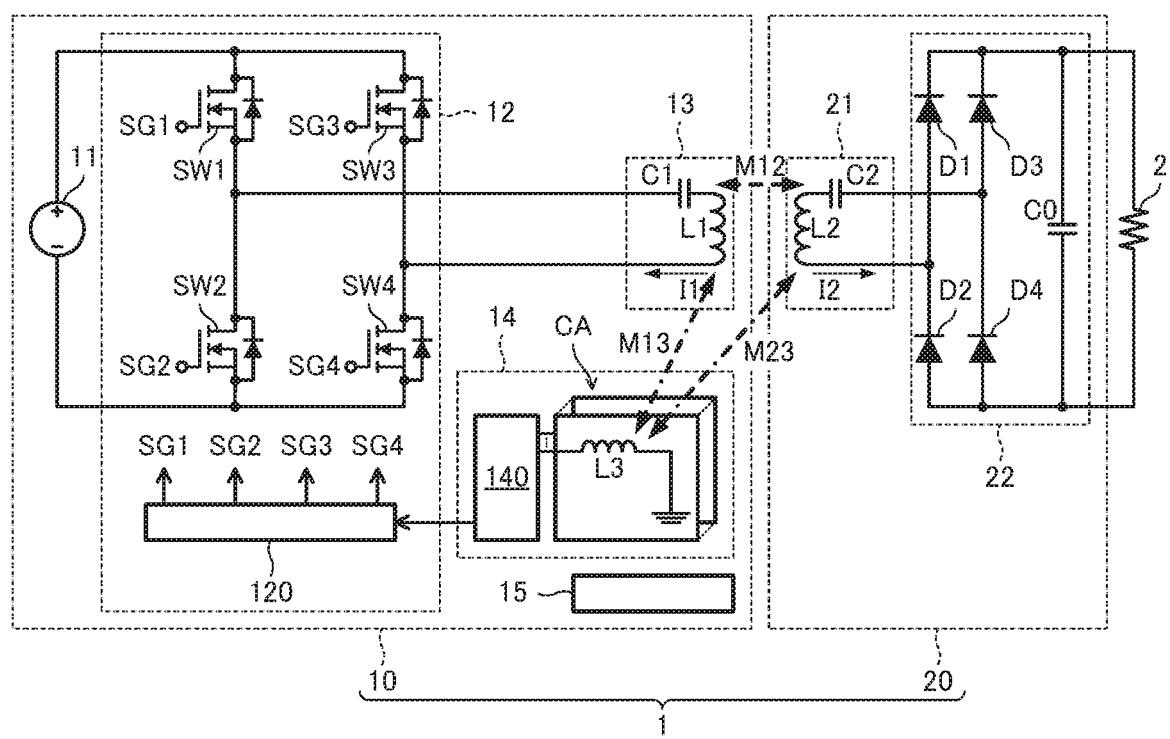
FIG. 2 is a view illustrating the internal circuit configurations of the wireless power transmitting device 10 and wireless power receiving device 20 illustrated in FIG. 1, respectively.

FIG. 2 is a view illustrating the internal circuit configurations of the wireless power transmitting device 10 and wireless power receiving device 20, respectively. Hereinafter, with reference to FIGS. 1 and 2, the outline of the configuration of the wireless power transmission system 1 will be described first, followed by detailed description of the characteristic configuration of the present invention.

As illustrated in FIGS. 1 and 2, the wireless power transmitting device 10 includes a DC power supply 11, a power converter 12, a feeding coil part 13, a metallic foreign object detector 14, and a noise detection part 15. Although the metallic foreign object detector 14 is provided in the wireless power transmitting device 10 in the present embodiment, it may be provided in the wireless power receiving device 20.

The DC power supply 11 supplies DC power to the power converter 12. The DC power supply 11 is not particularly limited in type as long as it can supply DC power. For example, a DC power supply obtained by rectifying/smoothing a commercial AC power supply, a secondary battery, a DC power supply generated by solar power, and a switching power supply such as a switching converter can be suitably used as the DC power supply 11.

The power converter 12 is an inverter that converts the DC power supplied from the DC power supply 11 into AC power to thereby supply AC current I1 illustrated in FIG. 2 to the feeding coil part 13. Specifically, as illustrated in FIG. 2, the power converter 12 includes a switching circuit (full-bridge circuit) including a plurality of bridge-connected switching elements SW1 to SW4 and a switch drive part 120. Although the switching circuit in the power converter 12 is constituted by the full-bridge circuit in this example, other type of switching circuit may be used.

The switching elements SW1 to SW4 are configured to perform ON/OFF operation independently of each other by control signals SG1 to SG4 supplied from the switch drive part 120 to the gates thereof, respectively. A MOSFET (Metal Oxide Semiconductor Field Effect Transistor) and an IGBT (Insulated Gate Bipolar Transistor) can be suitably used as the switching elements SW1 to SW4.

The switch drive part 120 is a signal generation part that generates the control signals SG1 to SG4 so that the output voltage of the switching circuit including the switching elements SW1 to SW4 becomes AC voltage of a predetermined frequency. Accordingly, the AC voltage of a predetermined frequency is supplied to a feeding coil L1 to be described later.

Hereinafter, the predetermined frequency is referred to as "power transmission frequency fp". The value of the power transmission frequency fp is set to, e.g., 20 [kHz] to 200 [kHz].

As illustrated in FIG. 2, the feeding coil part 13 is a resonance circuit (feeding side resonance circuit) including a feeding side capacitor C1 and a feeding coil L1 which are connected in series and generates an alternating magnetic field based on the AC voltage supplied from the power converter 12. The resonance frequency of the feeding side resonance circuit constituting the feeding coil part 13 is set to a frequency equal or close to the above-mentioned power transmission frequency fp. The feeding side capacitor C1 may be connected parallel to the feeding coil L1.

The feeding coil L1 is a spiral structure coil formed by planarly winding, by about several turns to about several tens of turns, a litz wire obtained by twisting about two thousand insulated copper wires each having a diameter of ϕ0.1 (mm) and is disposed, e.g., in or near the ground. When AC voltage is supplied from the power converter 12 to the feeding coil L1, the AC current I1 illustrated in FIG. 2 flows in the feeding coil L1, whereby the alternating magnetic field is generated. The alternating magnetic field causes electromotive force to be generated in a receiving coil L2 to be described later by a mutual inductance M12 between the feeding coil L1 and the receiving coil L2, whereby power transmission is achieved.

The metallic foreign object detector 14 is a device having a function of detecting the presence/absence of a metallic foreign object approaching the feeding coil L1 and includes a coil array CA including a plurality of antenna coils L3 and a detection part 140 connected to the antenna coils L3, as illustrated in FIG. 2. One end of each antenna coil L3 is connected to the detection part 140, and the other end thereof is grounded. Although not illustrated in FIG. 2, each antenna coil L3 constitutes a resonance circuit RC (see FIG. 4) together with a capacitor C3 (see FIG. 4) provided in the detection part 140.

The metallic foreign object detector 14 is provided for the purpose of detecting a metallic foreign object existing between the feeding coil L1 and the receiving coil L2. Thus, as illustrated in FIG. 1, at least apart (specifically, antenna coils L3) of the metallic foreign object detector 14 is disposed on the surface of the feeding coil L1 opposed to the receiving coil L2, i.e., between the feeding coil L1 and the receiving coil L2. The metallic foreign object detector 14 and feeding coil L1 may be formed as an integrated unit or as separate units.

Figure 3A:
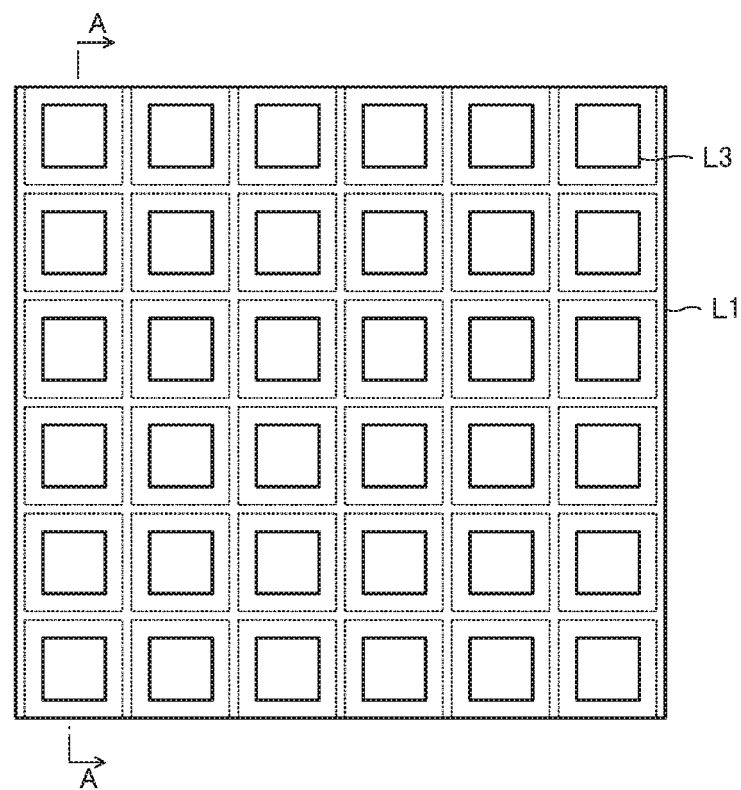
FIG. 3A is a plan view illustrating the positional relationship between the feeding coil L1 and the antenna coils L3 illustrated in FIG. 2.
Figure 3B:
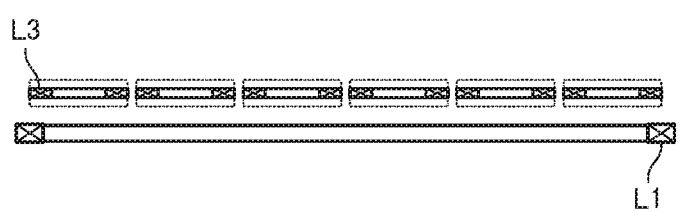
FIG. 3B is a cross-sectional view of the feeding coil L1 and antenna coils L3 taken along line A-A in FIG. 3A.

FIG. 3A is a plan view illustrating the positional relationship between the feeding coil L1 and the antenna coils L3, and FIG. 3B is a cross-sectional view of the feeding coil L1 and antenna coils L3 taken along line A-A in FIG. 3A. As illustrated, as viewed from above, the plurality of antenna coils L3 are arranged in a matrix within an area corresponding to the inside of the feeding coil L1. Such arrangement of the antenna coils L3 can be realized by placing, on the feeding coil L1, a printed board (not illustrated) on the surface of which a conductive coil pattern is formed.

Referring back to FIG. 2, the noise detection part 15 is configured to detect noise having a frequency higher than the power transmission frequency fp. The specific configuration of the noise detection part 15 is not particularly limited and, for example, the noise detection part 15 preferably includes a current detection circuit that detects a current waveform flowing in the feeding coil L1, a high-pass filter that extracts only a high-frequency component from an output signal from the current detection circuit, and a synchronization signal generation part that issues a synchronization signal when the amplitude of the output signal of the high-pass filter exceeds a predetermined value, i.e., during the generation period of the high-frequency component. In place of the current detection circuit, a voltage detection circuit such as a resistance-voltage dividing circuit may be used. The cut-off frequency of the high-pass filter is preferably set to a frequency higher than the power transmission frequency fp. Besides, the noise detection part 15 may be configured by disposing a magnetic sensor such as a hall element or a magnetoresistance effect element between the feeding coil L1 and the receiving coil L2.

The wireless power receiving device 20 includes a receiving coil part 21 and a rectifier 22, as illustrated in FIGS. 1 and 2.

As illustrated in FIG. 2, the receiving coil part 21 includes a resonance circuit (receiving side resonance circuit) including a receiving side capacitor C2 and a receiving coil L2 which are connected in series and plays a role as a power receiving part that receives AC power transmitted from the feeding coil L1 by wireless. The resonance frequency of the receiving side resonance circuit constituting the receiving coil part 21 is also set to a frequency equal or close to the above-mentioned power transmission frequency fp. The receiving side capacitor C2 may be connected parallel to the receiving coil L2.

Like the feeding coil L1, the receiving coil L2 is a spiral structure coil formed by planarly winding, by about several turns to about several tens of turns, a litz wire obtained by twisting about two thousand insulated copper wires each having a diameter of ϕ0.1 (mm). On the other hand, the mounting position of the receiving coil L2 differs from that of the feeding coil L1 and, for example, the receiving coil L2 is mounted to the lower portion of the body of an electric vehicle. When magnetic flux generate by the feeding coil L1 interlinks the receiving coil L2, electromotive force by electromagnetic induction is generated in the receiving coil L2, whereby AC current I2 illustrated in FIG. 2 flows in the receiving coil L2. The AC current I2 is converted into DC current by the rectifier 22 and is then supplied to the load 2. Thus, the DC power can be supplied to the load 2.

The rectifier 22 is a circuit that rectifies the AC current output from the receiving coil part 21 into DC current to supply DC power to the load 2. Specifically, as illustrated in FIG. 2, the rectifier 22 includes a bridge circuit including four bridge-connected diodes D1 to D4 and a smoothing capacitor C0 connected parallel to the bridge circuit.

The load 2 includes a charger and a battery which are not illustrated. The charger is a circuit that charges the battery based on the DC power output from the rectifier 22. The charging is executed by, e.g., constant-voltage/constant-current charging (CVCC charging). The battery is not particularly limited in type as long as it can store power. For example, a secondary battery (lithium-ion battery, a lithium-polymer battery, a nickel battery, etc.) and a capacitive element (electric double-layer capacitor, etc.) can be suitably used as the battery constituting the load 2.

The following describes in detail the metallic foreign object detector 14 with reference to FIGS. 4 to 10.

Figure 4:
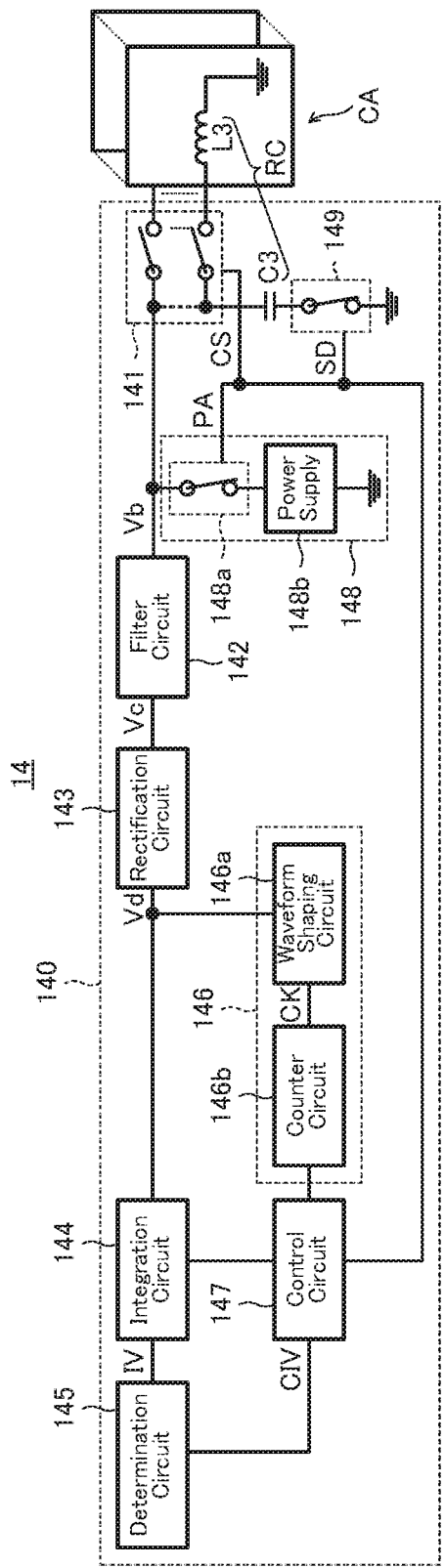
FIG. 4 is a schematic block diagram illustrating the functional block of the metallic foreign object detector 14 illustrated in FIG. 2.
Figure 5:
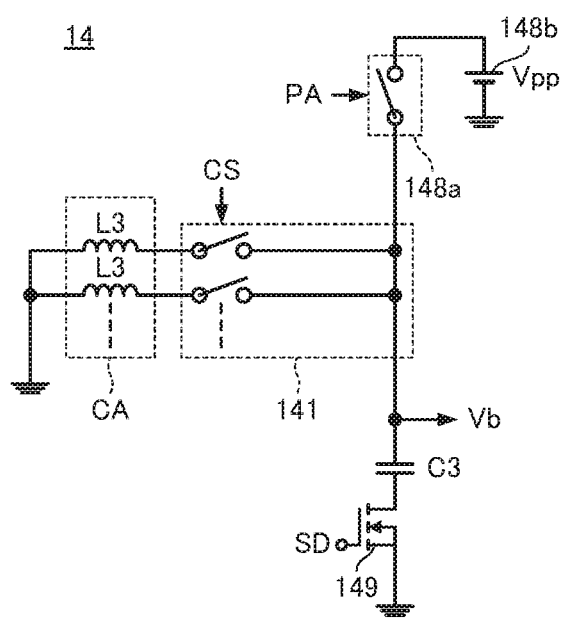
FIG. 5 is a view illustrating a part (a circuit part related to generation of a vibration signal Vb) of the configuration of the metallic foreign object detector 14 illustrated in FIG. 4.

FIG. 4 is a schematic block diagram illustrating the functional block of the metallic foreign object detector 14, and FIG. 5 is a view illustrating a part (a circuit part related to generation of a vibration signal Vb) of the configuration of the metallic foreign object detector 14 illustrated in FIG. 4. As illustrated in FIG. 4, the detection part 140 functionally includes a detection changeover switch 141, a filter circuit 142, a rectification circuit 143, an integration circuit 144, a determination circuit 145, a wavenumber detection circuit 146, a control circuit 147, a drive circuit 148, a capacitor C3, and a resonance capacitor switch 149. The wavenumber detection circuit 146 includes a waveform shaping circuit 146a and a counter circuit 146b. The drive circuit 148 includes a switching circuit 148a and a power supply 148b.

The detection changeover switch 141 is a composite switch including a plurality of switches whose one ends are connected in common to the filter circuit 142 and whose other ends are connected to the respective antenna coils L3 and is configured to selectively bring one of the switches into a closed state according to a coil selection signal CS supplied from the control circuit 147. Hereinafter, one ends of the switches connected in common to the filter circuit 142 are sometimes collectively referred to as the "common terminal" of the detection changeover switch 141. As the detection changeover switch 141, a semiconductor switch and a multiplexer are preferably used. The voltage appearing at the common terminal of the detection changeover switch 141 is supplied to the filter circuit 142 as a vibration signal Vb.

The capacitor C3 and the resonance capacitor switch 149 are connected in series in this order between the common terminal of the detection changeover switch 141 and a ground terminal. The resonance capacitor switch 149 is a switch (first switch) inserted into a resonance circuit RC constituted of the antenna coil L3 selected by the coil selection signal CS and the capacitor C3 and is configured to perform opening/closing operation according to a switch drive signal SD supplied from the control circuit 147. When the resonance capacitor switch 149 is in a closed state, a loop circuit including the antenna coil L3 and capacitor C3 is formed, with the result that the resonance circuit RC functions as a resonance circuit. When the resonance capacitor switch 149 is in an opened state, the resonance circuit RC does not function as a resonance circuit. For example, as the resonance capacitor switch 149, an n-channel type MOSFET is preferably used as exemplified in FIG. 5.

The switching circuit 148a is a single-pole single-throw switch (second switch) having a terminal connected to the power supply 148b and a terminal connected to the common terminal of the detection changeover switch 141 and is configured to perform opening/closing operation according to a pulse application signal PA supplied from the control circuit 147. As the switching circuit 148a, a bipolar transistor and a MOSFET are preferably used.

The power supply 148b is a power supply circuit (drive part) that generates voltage to be applied to the resonance circuit RC. The power supply 148b may be a DC power supply or an AC power supply. Hereinafter, description will be given assuming that the power supply 148b is constituted by a DC power supply that generates DC voltage Vpp, as exemplified in FIG. 5. One end of the power supply 148b is connected to the switching circuit 148a, and the other end thereof is grounded.

The control circuit 147 is a circuit (control part) having a function of generating the above-mentioned coil selection signal CS, switch drive signal SD, and pulse application signal PA, and supplies them to the detection changeover switch 141, resonance capacitor switch 149, and switching circuit 148a, respectively.

The coil selection signal CS is a signal that designates one of the plurality of antenna coils L3. The control circuit 147 is configured to sequentially select the antenna coils L3 one by one at an equal time interval and supply the coil selection signal CS designating the selected antenna coil L3 to the detection changeover switch 141. As a result, the antenna coils L3 are sequentially connected one by one to the filter circuit 142. After selecting the last antenna coil L3, the control circuit 147 repeats the selection operation from the first antenna coil L3.

The control circuit 147 may be configured to exclude some of the plurality of antenna coils L3 from the selection target coils according to the user's setting or the like. This allows an area to be subjected to the metallic foreign object detection to be narrowed to increase detection time of the metallic foreign object by one antenna coil L3 as compared to a case where all the antenna coils L3 are used.

The pulse application signal PA is a signal indicating the timing at which voltage is applied to the resonance circuit RC. The control circuit 147 selects one antenna coil L3 according to the coil selection signal CS and then activates the pulse application signal PA at a predetermined timing to thereby bring the switching circuit 148a into a closed state. This causes the DC voltage Vpp to be applied from the power supply 148b to the resonance circuit RC including the antenna coil L3 selected according to the coil selection signal CS. The control circuit 147 inactivates the pulse application signal PA after the elapse of a predetermined time from the activation thereof. This brings the switching circuit 148a into an opened state to stop application of the DC voltage Vpp to the resonance circuit RC including the antenna coil L3 selected according to the coil selection signal CS.

The switch drive signal SD is a signal indicating the start timing when the resonance circuit RC including the antenna coil L3 selected according to the coil selection signal CS and the capacitor C3 functions as a resonance circuit. The control circuit 147 activates the switch drive signal SD when voltage application to the resonance circuit RC is started by the activation of the pulse application signal PA to thereby bring the resonance capacitor switch 149 into a closed state. When the resonance capacitor switch 149 is brought into a closed state, the resonance circuit RC functions as a resonance circuit, as described above. The control circuit 147 inactivates the switch drive signal SD after the elapse of a predetermined time from the activation thereof. This brings the resonance capacitor switch 149 into an opened state, with the result that the resonance circuit RC no more functions as a resonance circuit.

Figure 6:
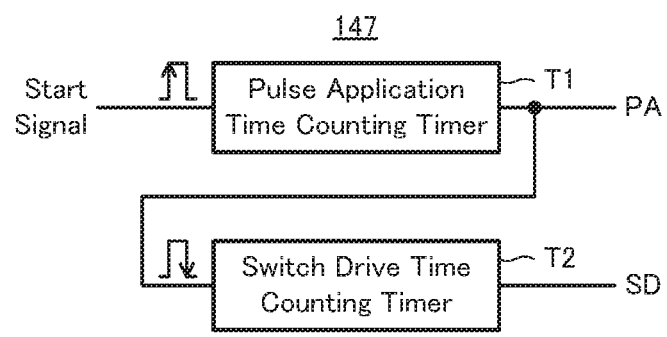
FIG. 6 is a schematic block diagram illustrating a part of the functional block of the control circuit 147 illustrated in FIG. 4 related to generation of the pulse application signal PA and switch drive signal SD.
Figure 7:
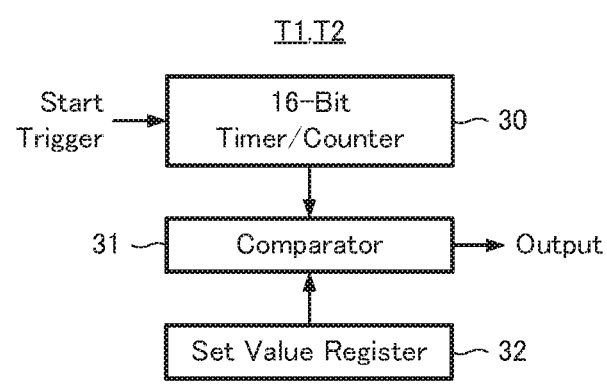
FIG. 7 is a view illustrating the internal configuration of a pulse application time counting timer T1 and a switch drive time counting timer T2 illustrated in FIG. 6.

FIG. 6 is a schematic block diagram illustrating a part of the functional block of the control circuit 147 related to generation of the pulse application signal PA and switch drive signal SD. FIG. 7 is a view illustrating the internal configuration of a pulse application time counting timer T1 and a switch drive time counting timer T2 illustrated in FIG. 6, and FIG. 8 is a waveform diagram of the vibration signal Vb, coil selection signal CS, pulse application signal PA, and switch drive signal SD according to the present embodiment.

Figure 8:
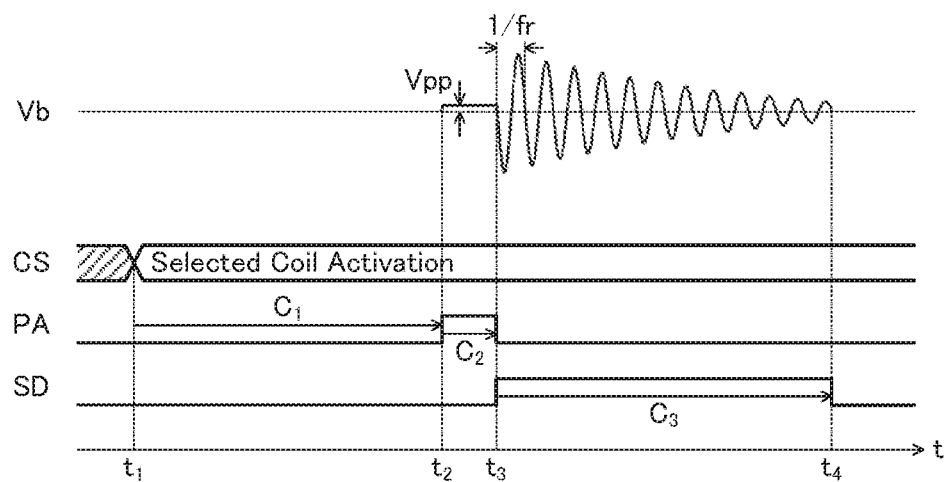
FIG. 8 is a waveform diagram of the vibration signal Vb, coil selection signal CS, pulse application signal PA, and switch drive signal SD illustrated in FIG. 4 and FIG. 5.

The purpose for which the control circuit 147 generates the pulse application signal PA and the switch drive signal SD is to allow the resonance circuit RC including the antenna coil L3 selected according to the coil selection signal CS to generate an attenuated vibration signal like the vibration signal Vb of FIG. 8. As illustrated in FIG. 8, the attenuated vibration signal is a signal vibrating at the resonance frequency fr of the resonance circuit RC. The resonance frequency fr changes depending on the presence/absence of the metallic foreign object between the feeding coil L1 and the receiving coil L2. Further, the amplitude of the attenuation vibration signal also changes depending on the presence/absence of the metallic foreign object between the feeding coil L1 and the receiving coil L2. The control circuit 147 performs detection operation of the metallic foreign object by utilizing such changes in the frequency and amplitude of the attenuation vibration signal. Hereinafter, the process of obtaining the attenuation vibration signal by the pulse application signal PA and switch drive signal SD will be described first, followed by detailed description of the metallic foreign object detection operation utilizing changes in the frequency and amplitude of the attenuation vibration signal.

As illustrated in FIG. 6, the control circuit 147 includes a pulse application time counting timer T1 (pulse application signal generation circuit) that generates the pulse application signal PA and a switch drive time counting timer T2 (switch drive signal generation circuit) that generates the switch drive signal SD. The pulse application time counting timer T1 and switch drive time counting timer T2 each include a 16-bit timer/counter 30, a comparator 31, and a set value register 32, as illustrated in FIG. 7.

Referring to FIG. 7, the 16-bit timer/counter 30 is a count circuit that starts counting with input of a start trigger. The set value register 32 is a storage circuit that stores a value previously set by a user. The comparator 31 is a circuit having a function of comparing the count value of the 16-bit timer/counter 30 and the value stored in the set value register 32 and is configured to activate an output signal with input of the start trigger to the 16-bit timer/counter 30 and inactive the output signal when the count value of the 16-bit timer/counter 30 coincides with the value stored in the set value register 32.

Referring to FIG. 6, the pulse application time counting timer T1 uses the rising edge of a start signal supplied from a not-shown circuit provided in the control circuit 147 as the start trigger illustrated in FIG. 7. Further, a time $C_2$ illustrated in FIG. 8 is previously set in the set value register 32 of the pulse application time counting timer T1 as the set value.

The control circuit 147 activates the start signal after the elapse of a predetermined time $C_1$ from when a new antenna coil L3 is selected according to the coil selection signal CS. Thus, as illustrated in FIG. 8, the pulse application signal PA output from the pulse application time counting timer T1 is activated at the time $t_2$ elapsing by the time $C_1$ from the time $t_1$ at which a new antenna coil L3 is selected according to the coil selection signal CS and is thereafter inactivated at the time t3 elapsing by the time $C_2$ from the time $t_2$. During the activation of the pulse application signal PA (during a time period between the time $t_2$ and the time $t_3$), the amplitude of the vibration signal Vb supplied to the filter circuit 142 illustrated in FIG. 4 is fixed to the DC voltage Vpp supplied from the power supply 148b, as illustrated in FIG. 8.

The switch drive time counting timer T2 uses the falling edge of the pulse application signal PA generated by the pulse application time counting timer T1 as the start trigger illustrated in FIG. 7. Further, a time $C_3$ illustrated in FIG. 8 is previously set in the set value register 32 of the switch drive time counting timer T2 as the set value. Thus, as illustrated in FIG. 8, the switch drive signal SD output from the switch drive time counting timer T2 is activated simultaneously with the end (time $t_3$) of application of the DC voltage Vpp to the resonance circuit RC by the power supply 148b and is thereafter inactivated at the time t4 elapsing by the time $C_3$ from the time $t_3$.

As described above, when the switch drive signal SD is activated, the resonance circuit RC constituted of the antenna coil L3 and the capacitor C3 functions as a resonance circuit. By the above operation of the pulse application time counting timer T1 and switch drive time counting timer T2, energy provided by the DC voltage Vpp is stored in the antenna coil L3 at the activation of the switch drive signal SD. This energy generates attenuation vibration in the resonance circuit RC immediately after the activation of the switch drive signal SD as the attenuation vibration signal having the frequency fr illustrated in FIG. 8. The attenuation vibration signal generated in the resonance circuit RC is supplied to the filter circuit illustrated in FIG. 4 as the vibration signal Vb.

The following describes the metallic foreign object detection operation utilizing changes in the frequency and amplitude of the attenuation vibration signal.

FIGS. 9A to 9D are waveform diagrams of the signals and the like (a vibration signal Vc, a signal Vd, an integral value IV, and a binary signal CK) illustrated in FIG. 4. In FIGS. 9A to 9D, only a part of each of the waveforms corresponding to a period after the time t3 in FIG. 8 is illustrated. Hereinafter, description will be given with reference to FIG. 4 and FIGS. 9A to 9D.

Figure 9A:
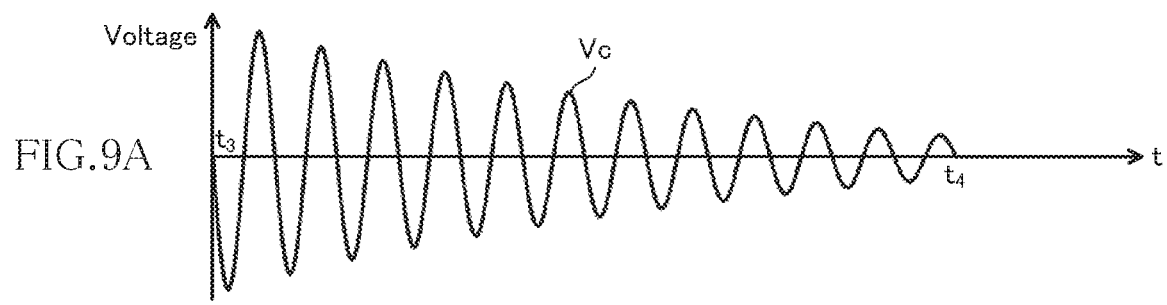
FIGS. 9A to 9D are waveform diagrams of the signals and the like (a vibration signal Vc, a signal Vd, an integral value IV, and a binary signal CK) illustrated in FIG. 4.

The vibration signal Vb generated in the resonance circuit RC is input to the filter circuit 142. The filter circuit 142 is constituted by a band-pass filter that extracts a frequency of the same band as the resonance frequency fr. Thus, as illustrated in FIG. 9A, the vibration signal Vc that is a signal output from the filter circuit 142 is a signal obtained by removing, from the vibration signal Vb, frequency components in a band different from the resonance frequency fr. The components thus removed include components of the power transmission frequency fp caused due to an alternating magnetic field for power feeding. The vibration signal Vc output from the filter circuit 142 is input to the rectification circuit 143.

Figure 9B:
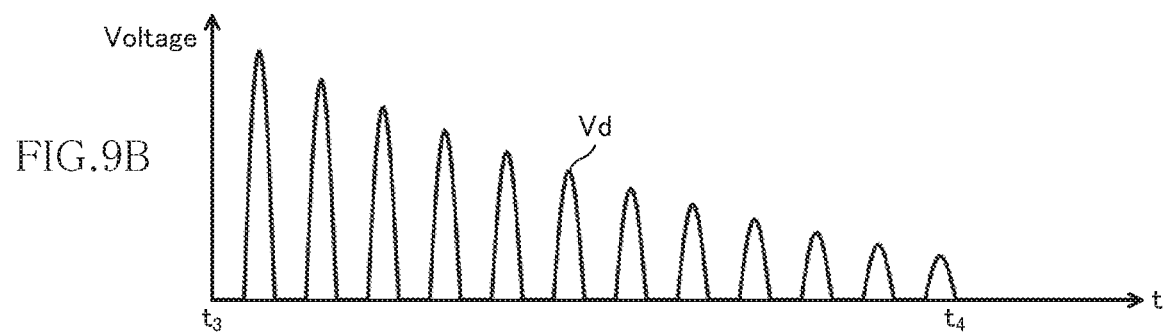

The rectification circuit 143 rectifies the vibration signal Vc to generate the pulse-like signal Vd illustrated in FIG. 9B. As the rectification circuit 143, a switching element such as a diode, a diode bridge circuit, or a semiconductor switch is preferably used. The rectification circuit 143 may be a half-wave rectification circuit, a full-wave rectification circuit, or other rectification circuit. The signal Vd output from the rectification circuit 143 is input to the integration circuit 144 and the wavenumber detection circuit 146.

Figure 9C:
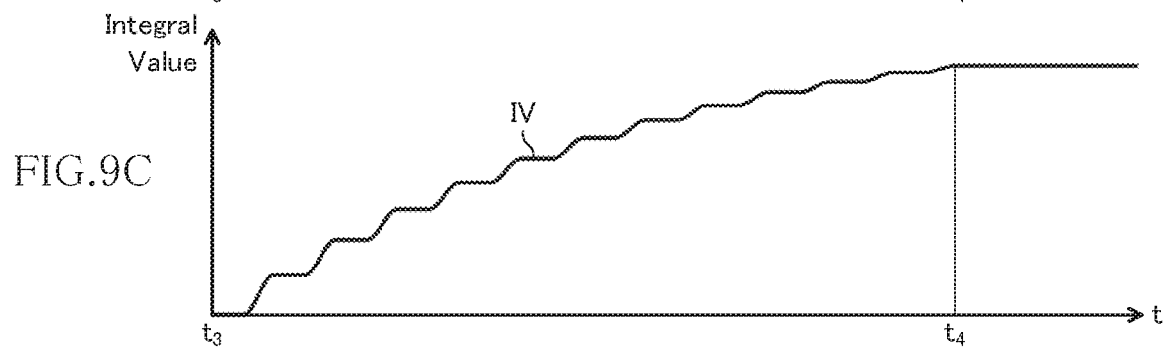

The integration circuit 144 is a circuit that obtains the integral value IV of the waveform of the signal Vd. Since the signal Vd is a pulse-like signal as described above, the integral value IV of the integration circuit 144 increases stepwise while the signal Vd is being generated, as illustrated in FIG. 9C. The start and end of the integration by the integration circuit 144 are controlled by the control circuit 147. FIG. 9C illustrates an example in which the integration is started simultaneously with the activation of the switch drive signal SD (time $t_3$) and ended simultaneously with the inactivation of the switch drive signal SD (time $t_4$).

The wavenumber detection circuit 146 is a circuit that detects the wavenumber of the vibration signal Vb (=wavenumber of the signal Vd). Specifically, the waveform shaping circuit 146a generates the binary signal CK illustrated in FIG. 9D from the signal Vd, and the counter circuit 146b counts the wavenumber of the binary signal CK to thereby detect the wavenumber of the signal Vd. Hereinafter, the operation of the above circuits will be described in detail.

Figure 9D:
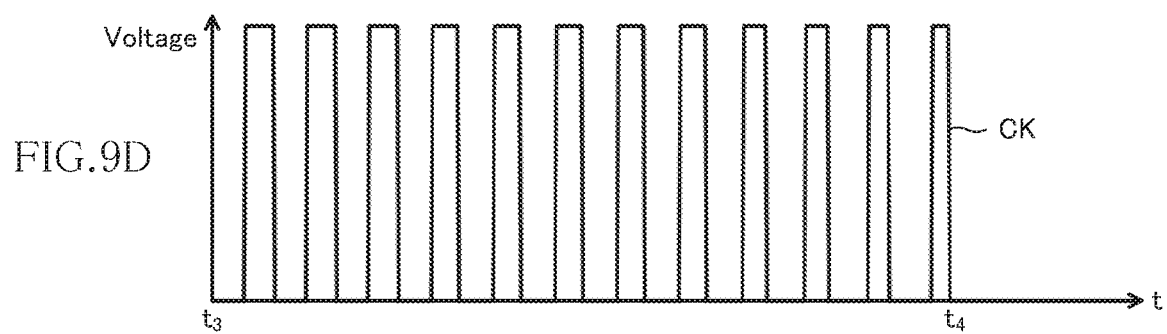

The waveform shaping circuit 146a performs threshold determination on the signal Vd generated by the rectification circuit 143 to generate the binary signal CK illustrated in FIG. 9D. As a threshold value used in the threshold determination, a previously set reference voltage value is preferably used. The concrete value of the reference voltage value is set to, e.g., the amplitude center voltage of the minimum amplitude (the minimum value of the amplitude of the signal Vd before the inactivation of the switch drive signal SD at the time $t_4$) of the signal Vd when metallic foreign object is absent. The binary signal CK is a signal that becomes high when the result of the threshold determination is equal to or larger than the threshold and becomes low when the result of the threshold determination is less than the threshold. Accordingly, the period of the binary signal CK coincides with the inverse of the resonance frequency of the resonance circuit RC. In the present embodiment, the binary signal CK is generated by the threshold determination on the signal Vd generated by the rectification circuit 143; however, the waveform shaping circuit 146a may generate the binary signal by performing threshold determination on the vibration signal Vc output from the filter circuit 142. In this case, as a threshold value used in the threshold determination, 0V is preferably used.

The counter circuit 146b is a circuit that performs counting operation using the binary signal CK generated by the waveform shaping circuit 146a as a clock and generates a digital value (count value) indicating the result of the counting operation. The start and end of the counting operation by the counter circuit 146b are controlled by the control circuit 147. The count value generated by the counter circuit 146b coincides with the wavenumber of the signal Vd, so that the wavenumber detection circuit 146 outputs the count value as the detection result of the wavenumber of the signal Vd.

The control circuit 147 performs the metallic foreign object detection operation by controlling the integration circuit 144, determination circuit 145, and wavenumber detection circuit 146. The control circuit 147 repeatedly performs this detection operation one or more times while one antenna coil L3 is selected.

Specifically, every time the control circuit 147 activates the switch drive signal SD, it supplies a predetermined wavenumber detection start signal to the wavenumber detection circuit 146 to make the wavenumber detection circuit 146 start the wavenumber detection and supplies a predetermined integration start signal to the integration circuit 144 to make the integration circuit 144 start the integration. The control circuit 147 may make the wavenumber detection circuit 146 start the wavenumber detection simultaneously with the activation of the switch drive signal SD or after the elapse of a predetermined time from the activation of the switch drive signal SD.

Thereafter, the control circuit 147 monitors the result (specifically, the count value output from the counter circuit 146b) of the wavenumber detection performed by the wavenumber detection circuit 146. When the detection result reaches a predetermined value (hereinafter, referred to as "integration target wavenumber"), the control circuit 147 supplies a predetermined integration end signal to the integration circuit 144 to make the integration circuit 144 end the integration and supplies a predetermined wavenumber detection end signal to the wavenumber detection circuit 146 to make the wavenumber detection circuit 146 end the wavenumber detection. The integration circuit 144 supplies the integral value IV at the time point when the integration is thus ended to the determination circuit 145.

The control circuit 147 also performs operation for acquiring a criterion integral value CIV serving as a criterion for the integral value IV. The criterion integral value CIV is an integral value IV when the metallic foreign object is absent between the feeding coil L1 and the receiving coil L2. The control circuit 147 executes the above control in a state where the absence of the metallic foreign object between the feeding coil L1 and the receiving coil L2 is guaranteed to acquire the criterion integral value CIV. At this time, the control circuit 147 uses the same value of the above-mentioned integration target wavenumber as that when the integral value IV is acquired in normal operation. Accordingly, the integral value IV and criterion integral value CIV are obtained by integrating the waveform having the same wavenumber. The control circuit 147 outputs the acquired criterion integral value CIV to the determination circuit 145 and stores the value CIV therein.

The determination circuit 145 is a circuit that detects the presence/absence of the metallic foreign object between the feeding coil L1 and the receiving coil L2 based on the integral value IV supplied from the integration circuit 144 and the stored criterion integral value CIV previously supplied from the control circuit 147. Specifically, when the absolute value of the difference between the integral value IV and the criterion integral value CIV falls within a predetermined value, the determination circuit 145 determines the absence of the metallic foreign object, and otherwise, it determines the presence thereof. The changes in the frequency and amplitude of the attenuation vibration signal illustrated in FIG. 8 bring about a change in the integral value IV, allowing the above determination of the determination circuit 145. Although the presence/absence of the metallic foreign object is detected utilizing the integral value IV of the waveform of the signal Vd in the present embodiment, it may be detected by utilizing a vibration time length (time length longer than one period) that is the length of time required for the vibration of the vibration signal Vc corresponding to a predetermined wavenumber larger than 1.

The determination result output from the determination circuit 145 is supplied to the control circuit 147. When the determination result indicates the presence of the metallic foreign object, the control circuit 147 instructs the switch drive part 120 illustrated in FIG. 2 to stop electric power conversion performed in the power converter 12. Upon receiving the instruction, the switch drive part 120 adjusts the control signals SG1 to SG4 illustrated in FIG. 2 so as not to allow AC power to be output from the power converter 12. As a result, the power feeding operation by the wireless power transmitting device 10 is stopped, making it possible to prevent an eddy current from occurring in the metallic foreign object due to an alternating magnetic field generated between the feeding coil L1 and the receiving coil L2, which in turn prevents the metallic foreign object from generating heat.

Here, the operation of a metallic foreign object detector 14 according to the background art of the present invention will be described so as to make the effect of the present invention clear. The metallic foreign object detector 14 according to the background art of the present invention differs from the metallic foreign object detector 14 according to the present embodiment in that it does not have the resonance capacitor switch 149. Thus, the resonance circuit RC constituted of the antenna coil L3 selected according to the coil selection signal CS and the capacitor C3 functions as a resonance circuit immediately after the detection changeover switch 141 is switched by the coil selection signal CS.

Figure 14:
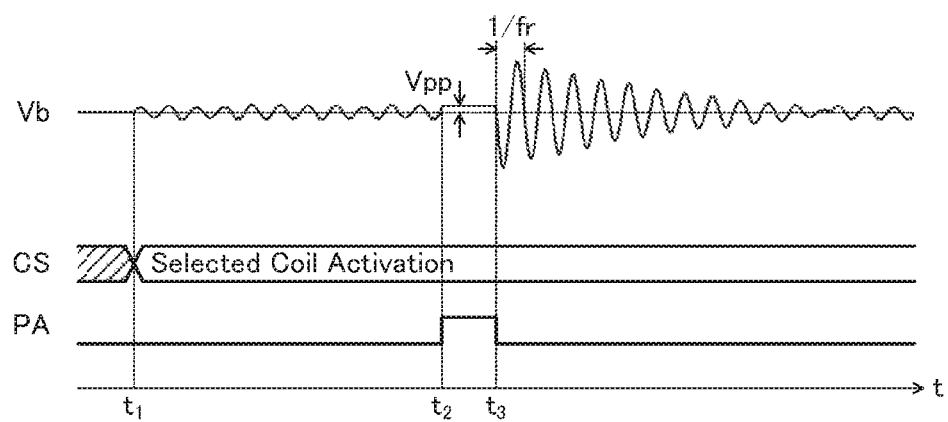
FIG. 14 is a waveform diagram of the vibration signal Vb, coil selection signal CS, and pulse application signal PA according to the background art.

FIG. 14 is a waveform diagram of the vibration signal Vb, coil selection signal CS, and pulse application signal PA according to the background art. As illustrated, in the background art, resonance is generated in the resonance circuit RC before the time $t_2$ at which the pulse application signal PA is activated. This resonance is generated due to the energy of magnetic flux generated from the feeding coil L1 illustrated in FIG. 2 or switching noise of the switching elements SW1 to SW4 illustrated in FIG. 2. When resonance is generated before the activation of the pulse application signal PA as described above, a vibration signal due to the resonance is superimposed on a signal to be supplied to the filter circuit 142 as the vibration signal Vb after the inactivation of the pulse application signal PA. Thus, the integral value VI changes by a factor other than the presence/absence of the metallic foreign object, disabling correct detection of the metallic foreign object during power feeding.

On the other hand, in the metallic foreign object detector 14 according to the embodiment of the present invention, the resonance circuit RC does not function as a resonance circuit until the start of the application of the DC voltage Vpp by the power supply 148b, thus preventing occurrence of the resonance due to the energy of magnetic flux generated from the feeding coil L1 or switching noise of the switching elements SW1 to SW4, as illustrated in FIG. 8. This suppresses a change in the integral value IV due to a factor other than the presence/absence of the metallic foreign object, allowing correct detection of the metallic foreign object during power feeding.

As described above, according to the metallic foreign object detector 14 of the present embodiment, deterioration in the accuracy of the metallic foreign object detection performed using the antenna coils L3 during power feeding can be suppressed. This eliminates the need to use the temperature sensor which is used in Patent Document 2, making it possible to avoid increase in device size and cost. Further, it is not necessary to periodically suspend power feeding for the metallic foreign object detection, making it possible to avoid increase in the charging period of time.

While the preferred embodiment of the present invention has been described, the present invention is not limited to the above embodiment and may be practiced in various forms without departing from the sprit and scope of the present invention.

For example, in the above embodiment, the switch drive time counting timer T2 illustrated in FIG. 6 uses the falling edge of the pulse application signal PA as the start trigger illustrated in FIG. 7, so that the inactivation of the pulse application signal PA and activation of the switch drive signal SD are always executed simultaneously. Alternatively, however, the inactivation time of the pulse application signal PA and the activation time of the switch drive signal SD may be shifted from each other. Hereinafter, this point will be described in greater detail.

Figure 10:
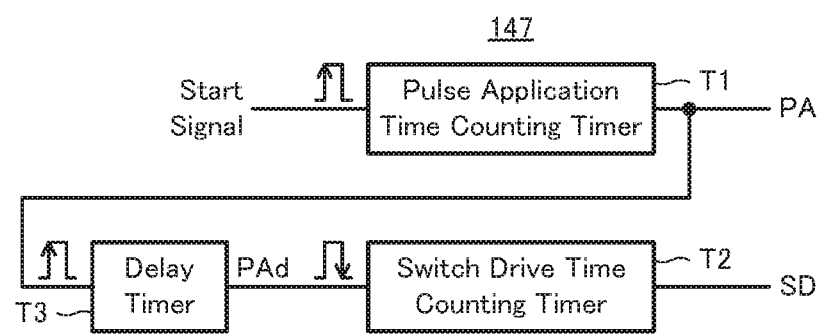
FIG. 10 is a schematic block diagram illustrating the functional block of the control circuit 147 according to a first modification of the embodiment of the present invention.
Figure 11:
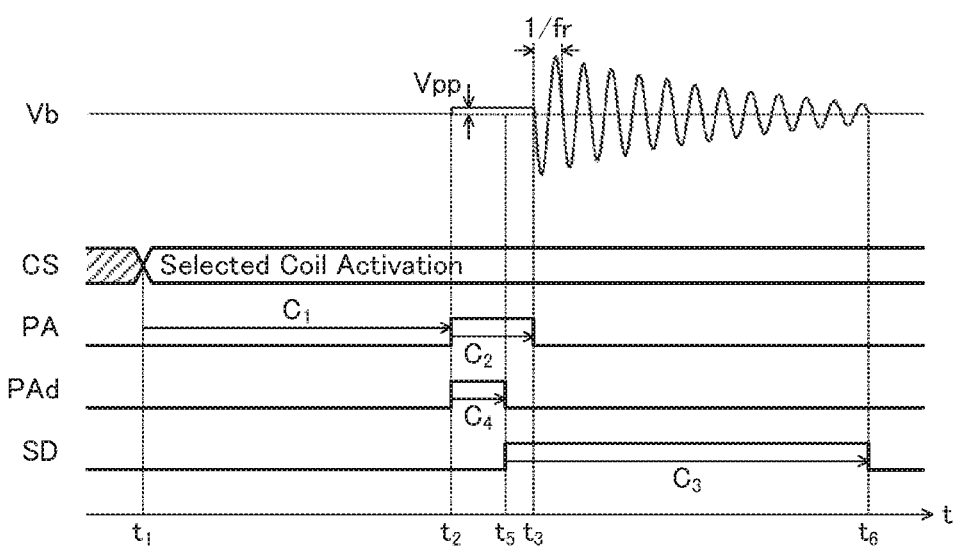
FIG. 11 is a waveform diagram of the vibration signal Vb, coil selection signal CS, pulse application signal PA, a corrected pulse application signal PAd, and switch drive signal SD according to the first modification of the embodiment of the present invention.

FIG. 10 is a schematic block diagram illustrating the functional block of the control circuit 147 according to a first modification of the embodiment of the present invention. FIG. 11 is a waveform diagram of the vibration signal Vb, coil selection signal CS, pulse application signal PA, a corrected pulse application signal PAd, and switch drive signal SD according to the first modification of the embodiment of the present invention.

As illustrated in FIG. 10, the control circuit 147 according to the first modification includes a delay timer T3 (delay circuit) at the front stage of the switch drive time counting timer T2. The internal configuration of the delay timer T3 is the same as those of the pulse application time counting timer T1 and the like illustrated in FIG. 7.

The delay timer T3 uses the rising edge of the pulse application signal PA as the start trigger illustrated in FIG. 7. Further, a time $C_4$ illustrated in FIG. 11 is previously set in the set value register 32 (see FIG. 7) of the delay timer T3 as the set value. Thus, as illustrated in FIG. 11, a signal (corrected pulse application signal PAd) output from the delay timer T3 is activated at the rising edge of the pulse application signal PA and then inactivated after the elapse of the time $C_4$. The value of the time $C_4$ is preferably set smaller than the value of the time $C_2$ as illustrated in FIG. 11. The corrected pulse application signal PAd is supplied, in place of the pulse application signal PA, to the switch drive time counting timer T2. Thus, as illustrated in FIG. 11, the switch drive signal SD is activated at the time is elapsing by the time $C_4$ from the rising edge of the pulse application signal PA and thereafter inactivated at the time $t_6$ elapsing by the time $C_3$ from the time $t_5$. In this case as well, the attenuation vibration of the vibration signal Vb starts at the time $t_3$ as illustrated in FIG. 11.

In the present modification, the value of the time $C_4$ can be set as desired. This allows the activation time of the switch drive signal SD to be set as desired, thus allowing the inactivation time of the pulse application signal PA and the activation time of the switch drive signal SD to be shifted from each other. As a matter of course, it is possible to simultaneously execute the inactivation of the pulse application signal PA and the activation of the switch drive signal SD as in the case of the above embodiment by setting the time $C_4$ to the same value as the time $C_2$.

Further, in the above embodiment, the antenna coils L3 are connected parallel to the detection part 140 as illustrated in FIG. 5 and the like to constitute the coil array CA. Alternatively, however, the coil array CA may be constituted by another connection method. Hereinafter, this point will be described in greater detail.

Figure 12:
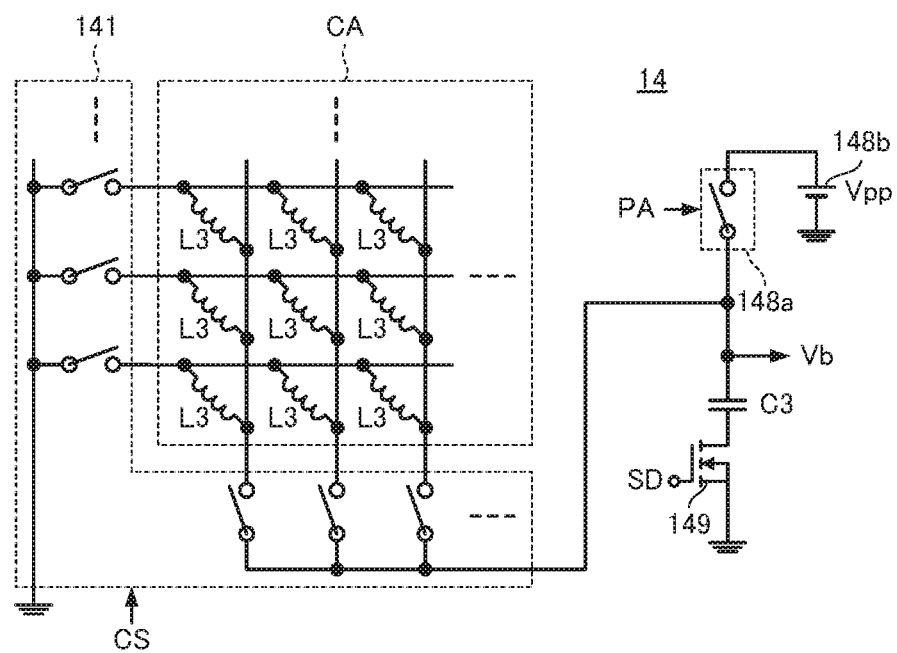
FIG. 12 is a view illustrating a part (a circuit part related to the generation of the vibration signal Vb) of the configuration of the metallic foreign object detector 14 according to a second modification of the embodiment of the present invention.

FIG. 12 is a view illustrating a part (a circuit part related to the generation of the vibration signal Vb) of the configuration of the metallic foreign object detector 14 according to a second modification of the embodiment of the present invention. In the metallic foreign object detector 14 according to the present modification, the antenna coils L3 are provided at the intersections of a plurality of wires arranged in a lattice shape to constitute the coil array CA.

The detection changeover switch 141 according to the present modification includes switches provided at one ends of the plurality of wires extending in the column direction and switches provided at one ends of the plurality of wires extending in the row direction. The former switches are connected in common to the resonance circuit RC, and the latter switches are grounded. With this configuration, it is possible to select one antenna coil L3 by bringing one switch in the column direction and one switch in the row direction into a closed state and bringing the remaining switches into an opened state. Thus, in the present modification, as in the case of the above embodiment, one antenna coil L3 can be selected according to the coil selection signal CS and can be made to constitute the resonance circuit RC together with the capacitor C3.

Hereinafter, the power supply configuration related to the pulse application time counting timer T1 and switch drive time counting timer T2 illustrated in FIG. 7 or FIG. 10 will be described.

Figure 13A:
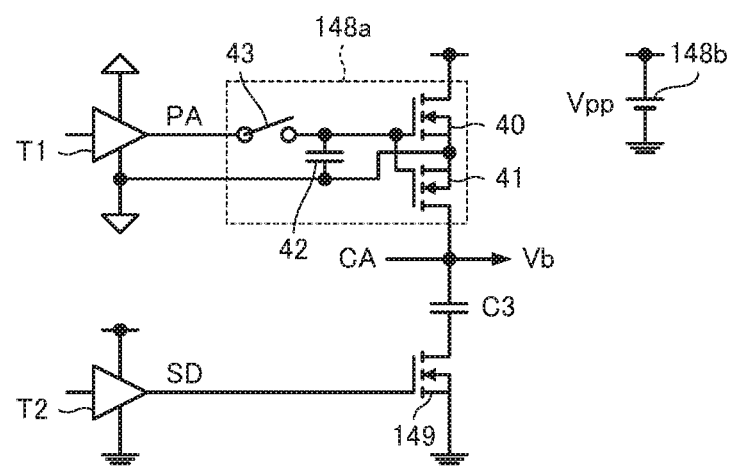
FIG. 13A is a view illustrating a first example of the power supply configuration related to the pulse application time counting timer T1 and switch drive time counting timer T2.
Figure 13B:
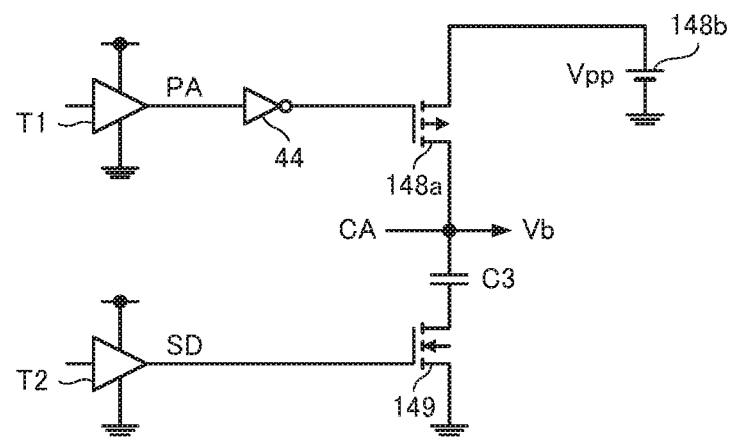
FIG. 13B is a view illustrating a second example of the power supply configuration related to the pulse application time counting timer T1 and switch drive time counting timer T2.

FIG. 13A is a view illustrating a first example of the power supply configuration related to the pulse application time counting timer T1 and switch drive time counting timer T2. FIG. 13B is a view illustrating a second example of the power supply configuration related to the pulse application time counting timer T1 and switch drive time counting timer T2. In FIGS. 13A and 13B, only a buffer constituting the last stage of each of the pulse application time counting timer T1 and switch drive time counting timer T2 is illustrated as a concrete example of a circuit constituting the timer T1 and T2.

In the first example illustrated in FIG. 13A, the switching circuit 148a is constituted of n-channel type MOSFETs 40 and 41, a capacitor 42, and a switch 43. The n-channel type MOSFETs 40 and 41 operate as a bidirectional switch. The source of the MOSFET 40 is connected, together with the source of the MOSFET 41, to a ground wiring common to the pulse application time counting timer T1. The drain of the MOSFET 40 is connected to the positive electrode of the power supply 148*b*, and the drain of the MOSFET 41 is connected to an output terminal for outputting the vibration signal Vb. The control electrodes of the respective MOSFETs 40 and 41 are commonly supplied with the pulse application signal PA through the switch 43. The capacitor 42 is connected between the control electrodes of the MOSFETs 40 and 41 and sources thereof.

In the first example, by thus configuring the switching circuit 148*a*, it is possible to use the power supply 148*b* as a drive power supply for the switch drive time counting timer T2, as illustrated in FIG. 13A. That is, the drive power supply for the switch drive time counting timer T2 constituting a part of the control circuit 147 and the power supply 148*b* can be realized by a single power supply, allowing reduction in the number of components and cost.

In the second example illustrated in FIG. 13B, the switching circuit 148*a* is constituted of a p-channel type MOSFET. The control electrode of the p-channel type MOSFET is supplied with the pulse application signal PA through a NOT circuit 44. In the second example, by thus configuring the switching circuit 148*a*, the drive power supply can be shared between the pulse application time counting timer T1 and the switch drive time counting timer T2. Thus, also in the second example, reduction in the number of components and cost can be achieved.

REFERENCE SIGNS LIST

1 wireless power transmission system
2 load
10 wireless power transmitting device
11 DC power supply
12 power converter
13 feeding coil part
14 metallic foreign object detector
15 noise detection part
20 wireless power receiving device
21 receiving coil part
22 rectifier
30 16-bit timer/counter
31 comparator
32 set value register
40, 41 n-channel type MOSFET
42 capacitor
43 switch
120 switch drive part
140 detection part
141 detection changeover switch
142 filter circuit
143 rectification circuit
144 integration circuit
145 determination circuit
146 wavenumber detection circuit
146*a* waveform shaping circuit
146*b* counter circuit
147 control circuit
148 drive circuit
148*a* switching circuit
148*b* power supply
149 resonance capacitor switch
C0 smoothing capacitor
C1 feeding side capacitor
C2 receiving side capacitor
C3 capacitor
CA coil array
CIV criterion integral value
D1-D4 diode
IV integral value
L1 feeding coil
L2 receiving coil
L3 antenna coil
RC resonance circuit
SG1-SG4 control signal
SW1-SW4 switching element
T1 pulse application time counting timer
T2 switch drive time counting timer
T3 delay timer

What is claimed is:

1. A metallic foreign object detector for a wireless power transmission system comprising a feeding side resonance circuit and a receiving side resonance circuit, the feeding side resonance circuit including a feeding coil and a feeding side capacitor, the receiving side resonance circuit including a receiving coil and a receiving side capacitor, the metallic foreign object detector comprising:
   an antenna coil disposed between the feeding coil and the receiving coil;
   a capacitor that constitutes a resonance circuit together with the antenna coil;
   a drive part that applies voltage to the resonance circuit to generate a vibration signal in the resonance circuit;
   a determination part that determines a presence/absence of a metallic foreign object based on a waveform of the vibration signal;
   a first switch inserted into the resonance circuit; and
   a control part that controls an open/close state of the first switch,
   wherein the control part brings the first switch into a closed state responding to the drive part starting application of voltage to the resonance circuit, and
   wherein the antenna coil and the capacitor are included in the metallic foreign object detector independently of the feeding coil, the feeding side capacitor, the receiving coil, and the receiving side capacitor.

2. The metallic foreign object detector as claimed in claim 1, wherein the control part brings the first switch into a closed state simultaneously with an end of the voltage application to the resonance circuit by the drive part.

3. The metallic foreign object detector as claimed in claim 2, further comprising a second switch inserted between the drive part and the resonance circuit,
   wherein the control part includes a switch drive signal generation circuit that generates a switch drive signal for controlling the open/close state of the first switch and a pulse application signal generation circuit that generates a pulse application signal for controlling an open/close state of the second switch, and
   wherein the switch drive signal generation circuit activates the switch drive signal and starts a timer when the pulse application signal has become inactivated and inactivate the switch drive signal when a timer value reaches a predetermined value.

4. The metallic foreign object detector as claimed in claim 1, further comprising a second switch inserted between the drive part and the resonance circuit,
   wherein the control part includes a switch drive signal generation circuit that generates a switch drive signal for controlling the open/close state of the first switch, a pulse application signal generation circuit that generates a pulse application signal for controlling an open/close state of the second switch, and a delay circuit that receives the pulse application signal, wherein the delay circuit activates an output signal therefrom and starts a timer when the pulse application signal is activated and inactivate the output signal when a timer value has reached a predetermined value, and wherein the switch drive signal generation circuit activates the switch drive signal and starts a timer when the output signal has become inactivated and inactivate the switch drive signal when the timer value has reached a predetermined value.

5. The metallic foreign object detector as claimed in claim 1, wherein the drive part is used as a drive power supply for a circuit constituting a part of the control part.

6. The metallic foreign object detector as claimed in claim 1, further comprising a second switch inserted between the drive part and the resonance circuit, wherein the control part includes a switch drive signal generation circuit that generates a switch drive signal for controlling the open/close state of the first switch and a pulse application signal generation circuit that generates a pulse application signal for controlling an open/close state of the second switch, and wherein the switch drive signal generation circuit and the pulse application signal generation circuit have a common drive power supply.

7. A wireless power transmitting device that transmits power by wireless from a feeding coil to a receiving coil, the wireless power transmitting device comprising:

the feeding coil; and the metallic foreign object detector as claimed in claim 1.

8. A wireless power receiving device that transmits power by wireless from a feeding coil to a receiving coil, the wireless power receiving device comprising:

the receiving coil; and the metallic foreign object detector as claimed in claim 1.

9. A wireless power transmission system that transmits power by wireless from a feeding coil to a receiving coil, the wireless power transmission system comprising:

a wireless power transmitting device having the feeding coil; and a wireless power receiving device having the receiving coil, wherein at least one of the wireless power transmitting device and wireless power receiving device has the metallic foreign object detector as claimed in claim 1.

10. The metallic foreign object detector as claimed in claim 2, further comprising a second switch inserted between the drive part and the resonance circuit, wherein the control part includes a switch drive signal generation circuit that generates a switch drive signal for controlling the open/close state of the first switch and a pulse application signal generation circuit that generates a pulse application signal for controlling an open/close state of the second switch, and wherein the switch drive signal generation circuit and the pulse application signal generation circuit have a common drive power supply.

* * * * *